United States Patent
Lee et al.

(10) Patent No.: US 12,237,537 B2
(45) Date of Patent: Feb. 25, 2025

(54) SEPARATOR INCLUDING POLYMER SUBSTRATE WITH POROUS COATING LAYER CONTAINING PVDF-BASED BINDER HAVING β-PHASE AND -PHASE CRYSTALS, AND LITHIUM SECONDARY BATTERY INCLUDING THE SAME

(71) Applicant: LG Chem, Ltd., Seoul (KR)

(72) Inventors: Joo-Sung Lee, Daejeon (KR); Bong-Tae Kim, Daejeon (KR); Kil-An Jung, Daejeon (KR)

(73) Assignee: LG Chem, Ltd., Seoul (KR)

(*) Notice: Subject to any disclaimer, the term of this patent is extended or adjusted under 35 U.S.C. 154(b) by 513 days.

(21) Appl. No.: 17/629,169

(22) PCT Filed: Aug. 7, 2020

(86) PCT No.: PCT/KR2020/010508
§ 371 (c)(1),
(2) Date: Jan. 21, 2022

(87) PCT Pub. No.: WO2021/029629
PCT Pub. Date: Feb. 18, 2021

(65) Prior Publication Data
US 2022/0255189 A1  Aug. 11, 2022

(30) Foreign Application Priority Data
Aug. 14, 2019 (KR) .................. 10-2019-0099817

(51) Int. Cl.
*H01M 50/449* (2021.01)
*H01M 10/0525* (2010.01)
(Continued)

(52) U.S. Cl.
CPC ..... *H01M 50/449* (2021.01); *H01M 10/0525* (2013.01); *H01M 50/446* (2021.01); *H01M 50/46* (2021.01)

(58) Field of Classification Search
CPC .... H01M 50/449; H01M 50/44; H01M 50/46; H01M 10/0525
(Continued)

(56) References Cited

U.S. PATENT DOCUMENTS

| 5,922,493 A | 7/1999 | Humphrey, Jr. et al. |
| 2013/0095365 A1 | 4/2013 | Nishikawa |

(Continued)

FOREIGN PATENT DOCUMENTS

| CN | 104051776 A | 9/2014 |
| CN | 106910859 A | 6/2017 |

(Continued)

OTHER PUBLICATIONS

International Search Report for Application No. PCT/KR2020/010508 mailed Dec. 1, 2020, 2 pages.
(Continued)

*Primary Examiner* — Sean P Cullen
(74) *Attorney, Agent, or Firm* — Lerner David LLP (57) ABSTRACT

A separator for a lithium secondary battery is provided. The separator includes a porous polymer substrate and a porous coating layer positioned on at least one surface of the porous polymer substrate. The porous coating layer includes inorganic particles and a binder polymer. The binder polymer includes a PVdF-based binder polymer, and the PVdF-based binder polymer has a first peak at a 2θ of 18.2±0.2° and a second peak at a 2θ of 19.8±0.2°, as analyzed by X-ray diffractometry (XRD), and a ratio of an area of the second peak to an area of the first peak (the area of the second peak/the area of the first peak) is equal to or more than 1.25
(Continued)

and less than 2.75. The separator for the lithium secondary battery includes fine and uniform pores formed on the surface thereof to provide an increased adhesive surface area to an electrode, resulting in improvement of adhesion to the electrode.

14 Claims, 1 Drawing Sheet (51) Int. Cl.
*H01M 50/446* (2021.01)
*H01M 50/46* (2021.01)
(58) Field of Classification Search
USPC .......................................... 429/144, 251, 254
See application file for complete search history.

(56) References Cited

U.S. PATENT DOCUMENTS

| | | |
|---|---|---|
| 2014/0272505 A1 | 9/2014 | Yoon et al. |
| 2017/0098809 A1 | 4/2017 | Ogata et al. |
| 2017/0179456 A1 | 6/2017 | Kim et al. |
| 2017/0263905 A1* | 9/2017 | Ogata ................. H01M 50/446 |
| 2017/0338460 A1 | 11/2017 | Kim et al. |
| 2018/0047962 A1* | 2/2018 | Honda ....................... C09J 7/26 |
| 2018/0123106 A1 | 5/2018 | Shin et al. |
| 2019/0245183 A1 | 8/2019 | Jeong et al. |
| 2020/0358064 A1 | 11/2020 | Kwon et al. |

FOREIGN PATENT DOCUMENTS

| | | | |
|---|---|---|---|
| CN | 107210414 A | 9/2017 | |
| CN | 107394090 A | 11/2017 | |
| EP | 3070764 A1 | 9/2016 | |
| EP | 3764424 A1 | 1/2021 | |
| JP | H08250127 A | 9/1996 | |
| JP | 2012104422 A | 5/2012 | |
| JP | 2013073670 A | 4/2013 | |
| JP | 2016-33913 A | 3/2016 | |
| KR | 20130031319 A | 3/2013 | |
| KR | 20140026009 A | 3/2014 | |
| KR | 1430975 B1 * | 8/2014 | .......... B32B 27/304 |
| KR | 101430975 B1 | 8/2014 | |
| KR | 20160069386 A | 6/2016 | |
| KR | 20160117962 A | 10/2016 | |
| KR | 20170024574 A | 3/2017 | |
| KR | 20170044074 A | 4/2017 | |
| KR | 20170141636 A | 12/2017 | |
| KR | 20180093831 A | 8/2018 | |
| WO | 2015026182 A1 | 2/2015 | |
| WO | 2019112323 A1 | 6/2019 | |

OTHER PUBLICATIONS

Extended European Search Report including Written Opinion for Application No. 20851722.7 dated Nov. 4, 2022, pp. 1-9.
Search Report dated Nov. 26, 23 from the Office Action for Chinese Application No. 202080052960.6 Issued Nov. 29, 2023, pp. 1-3.

* cited by examiner

SEPARATOR INCLUDING POLYMER SUBSTRATE WITH POROUS COATING LAYER CONTAINING PVDF-BASED BINDER HAVING β-PHASE AND -PHASE CRYSTALS, AND LITHIUM SECONDARY BATTERY INCLUDING THE SAME

CROSS-REFERENCE TO RELATED APPLICATION

The present application is a national phase entry under 35 U.S.C. § 371 of International Application No. PCT/KR2020/010508 filed on Aug. 7, 2020 which claims priority from Korean Patent Application No. 10-2019-0099817 filed on Aug. 14, 2019, the disclosures of which are incorporated herein by reference.

TECHNICAL FIELD

The present disclosure relates to a separator for a lithium secondary battery having improved adhesion to an electrode and resistance characteristics, and a lithium secondary battery including the same.

BACKGROUND

A lithium secondary battery is an energy storage device which has a fundamental structure of positive electrode/negative electrode/separator/electrolyte, can be charged/discharged through reversible conversion between chemical energy and electrical energy, and shows high energy density. Such lithium secondary batteries are used widely for compact electronic devices, such as cellular phones, notebook computers, or the like. Recently, application of lithium secondary batteries has been extended rapidly to hybrid electric vehicles (HEV), plug-in electric vehicles (plug-in EV), electric bikes (e-bikes) and energy storage systems (ESS) as a countermeasure to environmental problems, high oil price, energy efficiency and energy storage.

Securement of safety is an important problem to be solved in manufacturing and using such lithium secondary batteries. Particularly, a separator used generally in a lithium secondary battery shows severe heat shrinking behavior at high temperature or under other conditions due to its material property and characteristics during its manufacturing process to cause a safety-related problem, such as an internal short-circuit. Recently, there has been suggested an organic-inorganic composite porous separator having a porous inorganic coating layer formed by coating a mixture of inorganic particles with a binder polymer on a porous polymer substrate in order to ensure the safety of a lithium secondary battery. However, when forming an electrode assembly by stacking electrodes and separators, interlayer adhesion is not sufficient. Thus, it is highly likely that the electrode and separator are separated from each other. In this case, there is a problem in that the inorganic particles detached during the separation may function as local defects in the device.

To solve the above-mentioned problem, there has been used a method for forming an adhesive layer by inducing migration of a binder polymer toward the surface of a separator through humidified phase separation of a PVdF-based polymer, such as poly(vinylidene fluoride-co-hexafluoropropylene (PVdF-HFP) or poly(vinylidene fluoride-co-chlorotrifluoroethylene (PVdF-CTFE) so that the coating layer of the separator may be provided with adhesive force.

It is known that when using such a PVdF-based polymer in the coating layer of a separator, the adhesion of the PVdF-based polymer and the resistance characteristics thereof have a trade-off relationship. In other words, it is known that a PVdF-based polymer having excellent adhesion is disadvantageous in terms of resistance, while a PVdF-based polymer having advantageous resistance characteristics is disadvantageous in terms of adhesion.

DISCLOSURE

Technical Problem

The present disclosure is designed to solve the problems of the related art, and therefore the present disclosure is directed to providing a separator for a lithium secondary battery provided with a porous coating layer including inorganic particles, and having adhesion to an electrode and resistance characteristics improved at the same time to a level enough to satisfy the requirements in the art.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

According to the first embodiment of the present disclosure, there is provided a separator for a lithium secondary battery which includes: a porous polymer substrate; and a porous coating layer positioned on at least one surface of the porous polymer substrate and containing inorganic particles and a binder polymer, wherein the binder polymer includes a PVdF-based binder polymer, and the PVdF-based binder polymer has a first peak at a 2θ of 18.2±0.2° and a second peak at a 2θ of 19.8±0.2°, as analyzed by X-ray diffractometry (XRD), and the ratio of the area of the second peak to the area of the first peak (area of the second peak/area of the first peak) is equal to or more than 1.25 and less than 2.75.

According to the second embodiment of the present disclosure, there is provided the separator for a lithium secondary battery as defined in the first embodiment, wherein the PVdF-based binder polymer includes a first PVdF-based binder polymer and a second PVdF-based binder polymer.

According to the third embodiment of the present disclosure, there is provided the separator for a lithium secondary battery as defined in the second embodiment, wherein the second PVdF-based binder polymer is used in an amount of 5-50 wt % based on the total weight of the binder polymers contained in the porous coating layer.

According to the fourth embodiment of the present disclosure, there is provided the separator for a lithium secondary battery as defined in the second or the third embodiment, wherein the second PVdF-based binder polymer is used in an amount of 12-35 wt % based on the total weight of the binder polymers contained in the porous coating layer.

According to the fifth embodiment of the present disclosure, there is provided the separator for a lithium secondary battery as defined in the any one of the second to the fourth embodiments, wherein the first PVdF-based binder polymer is PVdF-HFP.

According to the sixth embodiment of the present disclosure, there is provided the separator for a lithium secondary battery as defined in the any one of the second to the fifth embodiments, wherein the second PVdF-based binder polymer is PVdF-TFE, PVdF-TrFE or a mixture thereof.

According to the seventh embodiment of the present disclosure, there is provided the separator for a lithium secondary battery as defined in the sixth embodiment, wherein PVdF-TFE and PVdF-TrFE have a ratio of substitution with TFE and TrFE of 5-50 mol %, respectively.

According to the eighth embodiment of the present disclosure, there is provided the separator for a lithium secondary battery as defined in the sixth or the seventh embodiment, wherein PVdF-TFE and PVdF-TrFE have a ratio of substitution with TFE and TrFE of 10-30 mol %, respectively.

According to the ninth embodiment of the present disclosure, there is provided the separator for a lithium secondary battery as defined in the any one of the first to the eighth embodiments, wherein the porous coating layer includes interstitial volumes among the inorganic particles, the interstitial volumes are spaces defined by the adjacent inorganic particles that are substantially in contact with one another, and the interstitial volumes among the inorganic particles become vacant spaces to form the pores of the porous coating layer.

According to the tenth embodiment of the present disclosure, there is provided a lithium secondary battery including a positive electrode, a negative electrode and a separator interposed between the positive electrode and the negative electrode, wherein the separator is the separator for a lithium secondary battery as defined in any one of the first to the ninth embodiments.

Advantageous Effects

The separator for a lithium secondary battery according to an embodiment of the present disclosure includes fine and uniform pores formed on the surface thereof to provide an increased adhesive surface area to an electrode, resulting in improvement of adhesion to an electrode.

In addition, since the separator for a lithium secondary battery according to an embodiment of the present disclosure includes an ion conduction path formed by the fine and uniform pores formed on the surface thereof, it has low interfacial resistance and provides improved output and life characteristics.

As a result, the present disclosure provides a separator for a lithium secondary battery having both improved adhesion and improved interfacial resistance.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In one aspect of the present disclosure, there is provided a separator for a lithium secondary battery which includes: a porous polymer substrate; and a porous coating layer positioned on at least one surface of the porous polymer substrate and containing inorganic particles and a binder polymer, wherein the binder polymer includes a PVdF-based binder polymer, and the PVdF-based binder polymer has a first peak at a 2θ of 18.2±0.2° and a second peak at a 2θ of 19.8±0.2°, as analyzed by X-ray diffractometry (XRD), and the ratio of the area of the second peak to the area of the first peak (area of the second peak/area of the first peak) is equal to or more than 1.25 and less than 2.75. Herein, the first peak is the refraction peak of α-phase crystals of the PVdF-based binder polymer and the second peak is the refraction peak of β-phase crystals of the PVdF-based binder polymer.

Hereinafter, each of the constitutional elements of the separator will be explained in detail.

1. Porous Polymer Substrate

According to an embodiment of the present disclosure, the porous polymer substrate provides a lithium ion transport channel, while insulating a negative electrode and a positive electrode electrically from each other to prevent a short-circuit. Any material may be used with no particular limitation, as long as it is used conventionally as a material of a separator for a lithium secondary battery. Particular examples of the porous polymer substrate include porous polymer substrates made of at least one polymer resin selected from polyolefins, polyethylene terephthalate, polybutylene terephthalate, polyacetal, polyamide, polycarbonate, polyimide, polyetherether ketone, polyether sulfone, polyphenylene oxide, polyphenylene sulfide or polyethylene naphthalate, but are not limited thereto.

In addition, the porous polymer substrate may be a sheet-like film formed by melting a polymer resin. Preferably, the porous polymer substrate is a porous polymer substrate provided in the form of a sheet-like film formed by melting the above-mentioned polymer resin.

Particularly, the porous polymer substrate may be any one of the following a) to c):
  a) A porous film formed by melting and extruding a polymer resin;
  b) A multilayer film formed by stacking two or more layers of the porous films of a);
  c) A porous composite film having a multilayer structure including both a) and b).

According to an embodiment of the present disclosure, the porous polymer substrate may have a thickness of 5-50 μm. The thickness of the porous polymer substrate is not limited to the above-defined range. However, when the thickness is excessively smaller than the above-defined lower limit, the separator shows poor mechanical properties and may be damaged with ease during the use of a battery. Meanwhile, the size of pores present in the porous polymer substrate and the porosity thereof are not particularly limited, but may be 0.01-50 μm and 10-95%, respectively.

2. Porous Coating Layer

According to an embodiment of the present disclosure, a porous coating layer is formed on one surface or both surfaces of the porous polymer substrate. The porous coating layer includes a mixture of a plurality of inorganic particles with a binder polymer, and the inorganic particles are integrated by means of the binder polymer to form a layer. The binder of the porous coating layer allows the inorganic particles to be attached to one another to retain their binding state (i.e. the inorganic particles are connected with one another and fixed by the binder). In addition, the inorganic particles can retain their binding state to the porous polymer substrate by the binder. The inorganic particles in the porous coating layer form interstitial volumes, while being in substantially in contact with one another. Herein, the interstitial volumes mean spaces defined by the inorganic particles facing one another substantially in a closely packed or densely packed structure of the inorganic particles. The interstitial volumes among the inorganic particles become vacant spaces to form the pores of the porous coating layer.

When the surface of the porous polymer substrate is coated with the porous coating layer including inorganic particles as described above, it is possible to further improve heat resistance and mechanical properties. In other words, since the inorganic particles generally do not undergo a change in physical properties even at a high temperature of 200° C., the separator for a lithium secondary battery has excellent heat resistance by virtue of the porous coating layer.

According to an embodiment of the present disclosure, the porous coating layer has a thickness of 1-50 μm, 2-30 μm, or 2-20 μm.

According to an embodiment of the present disclosure, the weight ratio of the inorganic particles to the binder polymer in the porous coating layer is determined by considering the thickness, pore size and porosity of a finished porous coating layer, and the inorganic particles are used in an amount of 50-99.9 wt % or 60-99.5 wt % and the binder polymer is used in an amount of 0.1-50 wt % or 0.5-40 wt %. When the inorganic particles are used within the above-defined range, it is possible to solve the problem of degradation of the quality of a finished battery, caused by an excessively high content of the binder polymer resulting from a content of the inorganic particles of less than 50 wt %, a decrease in vacant spaces formed among the inorganic particles, and a decrease in pore size and porosity and it is also possible to solve the problem of degradation of the mechanical properties of a finished porous coating layer, caused by an excessively low content of the binder polymer resulting from a content of the inorganic particles of larger than 99.9 wt % and reduction of the adhesion among the inorganic particles.

According to an embodiment of the present disclosure, although there is no particular limitation in the particle size of the inorganic particles of the porous coating layer, the inorganic particles may have a particle size of 0.001-10 μm, 0.01-10 μm, 0.05-5 μm, or 0.1-2 μm with a view to formation of a coating layer having a uniform thickness and suitable porosity. When the particle size of the inorganic particles satisfies the above-defined range, the inorganic particles maintain dispersibility to facilitate controlling the physical properties of a separator for a lithium secondary battery. In addition, it is possible to avoid an increase in thickness of the porous coating layer to improve the mechanical properties.

Further, it is less likely that an internal short-circuit occurs during the charge/discharge of a battery due to an excessively large pore size.

There is no particular limitation in the inorganic particles, as long as they are electrochemically stable. In other words, there is no particular limitation in the inorganic particles, as long as they cause no oxidation and/or reduction in the range (e.g. 0-5V based on Li/Li$^+$) of operating voltage of an applicable electrochemical device. Particularly, when using inorganic particles having ion transportability, it is possible to increase the ion conductivity in an electrochemical device and to assist improvement of property. In addition, when using inorganic particles having a high dielectric constant, it is possible to improve the ion conductivity of an electrolyte by increasing the dissociation degree of an electrolyte salt, such as a lithium salt, in a liquid electrolyte.

For reason of the above-mentioned reasons, the inorganic particles may be inorganic particles having a dielectric constant of 5 or more, or 10 or more, inorganic particles having lithium ion transportability, or a mixture thereof. Non-limiting examples of the inorganic particles having a dielectric constant of 5 or more may include any one selected from the group consisting of $BaTiO_3$, $Pb(Zr,Ti)O_3$ (PZT), $Pb_{1-x}La_xZr_{1-y}Ti_yO_3$ (PLZT, wherein 0<x<1, 0<y<1), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, γ-AlOOH, SiC and $TiO_2$, or a mixture of two or more of them. In addition, when using the inorganic particles having a high dielectric constant in combination with the inorganic particles having lithium ion transportability, it is possible to provide a synergic effect.

Non-limiting examples of the inorganic particles having lithium ion transportability include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$-based glass (1<x<4, 0<y<13), such as $14Li_2O$-$9Al_2O_3$-$38TiO_2$-$39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), such as $Li_{3.25}Ge_{0.25}P_{0.75}S_4$, lithium nitride ($Li_xN_y$, 0<x<4, 0<y<2), such as $Li_3N$, $SiS_2$-based glass ($Li_xSi_yS_z$, 0<x<3, 0<y<2, 0<z<4), such as $Li_3PO_4$—$Li_2S$—$SiS_2$, and $P_2S_5$-based glass ($Li_xP_yS_z$, 0<x<3, 0<y<3, 0<z<7), such as LiI—$Li_2S$—$P_2S_5$, or a mixture thereof.

According to an embodiment of the present disclosure, the porous coating layer includes a PVdF-based binder polymer as a binder polymer.

In addition, according to an embodiment of the present disclosure, the PVdF-based binder polymer includes two or more types of PVdF-based binder polymers containing a first PVdF-based binder polymer and a second PVdF-based binder polymer.

According to the present disclosure, the PVdF-based binder polymer has a first peak at a 2θ of 18.2±0.2° and a second peak at a 2θ of 19.8±0.2°, as analyzed by X-ray diffractometry (XRD), and the ratio of the area of the second peak to the area of the first peak (area of the second peak/area of the first peak) is equal to or more than 1.25 and less than 2.75. Herein, the first peak is the refraction peak of α-phase crystals of the PVdF-based binder polymer and the second peak is the refraction peak of β-phase crystals of the PVdF-based binder polymer.

When the ratio of the area of the second peak to the area of the first peak (area of the second peak/area of the first peak) is equal to or more than 1.25, it is possible to solve the problem of degradation of cycle characteristics, caused by excessively high electrolyte uptake of the binder polymer, an increase in resistance of the separator for a lithium secondary battery, and a decrease in interfacial adhesion between the separator for a lithium secondary battery and an electrode. In addition, when the ratio of the area of the second peak to the area of the first peak (area of the second peak/area of the first peak) is less than 2.75, it is possible to solve the problem of a difficulty in ensuring desired adhesion and/or production processability, caused by excessive hardening of the binder polymer crystals and a limitation in deformation of the binder polymer during the lamination of the separator for a lithium secondary battery with electrodes in a dry state.

The ratio of β-phase crystals of the PVdF-based binder polymer used for the porous coating layer according to an embodiment of the present disclosure may be analyzed through X-ray diffractometry. The first peak appearing at a 2θ of 18.2±0.2° means the crystal structure of α-phase of the PVdF-based binder polymer and the second peak appearing at a 2θ of 19.8±0.2° means the crystal structure of β-phase of the PVdF-based binder polymer. Therefore, the ratio of the area of the second peak to the area of the first peak (area of the second peak/area of the first peak) is defined as the ratio of β-phase to α-phase of the PVdF-based binder polymer. Preferably, the ratio is equal to or more than 1.25 and less than 2.75 (the proportion of β-phase is higher than that of α-phase).

The following method is used to determine the ratio of the area of the second peak to the area of the first peak (area of the second peak/area of the first peak): A binder polymer is prepared, and then a sample holder is attached to KAPTON tape by using Xeuss 2.0 SAXS/WAXS system. Analysis is carried out at a SDD of 6.7 cm in a range of 2.5°≤2θ≤52° for 120 seconds, the 2D image obtained from the analysis is converted into a 1D image through circular averaging based on beam stop by using Foxtrot program. The KAPTON scattering intensity determined with the same configuration (6.7 cm SDD) for the same time is used as background. In the 1D image, the peak at a 2θ of 18.2±0.2° around a 2θ of 18.2° is defined as the first peak and the peak at a 2θ of 19.8±0.2° around a 2θ of 19.8° is defined as the second peak. The first peak and the second peak are isolated, the area of each peak is calculated, and then the ratio of the area of the second peak/area of the first peak is obtained.

Herein, a PVdF-based binder polymer which shows a peak at a 2θ of 18.2±0.2° and is easy to form α-phase crystals is referred to as the first PVdF-based binder polymer, and a PVdF-based binder polymer which shows a peak at a 2θ of 19.8±0.2° and is easy to form β-phase crystals is referred to as the second PVdF-based binder polymer.

According to an embodiment of the present disclosure, there is provided a separator for a lithium secondary battery, wherein the PVdF-based binder polymer substantially includes the first PVdF-based binder polymer and the second PVdF-based binder polymer.

According to an embodiment of the present disclosure, there is provided a separator for a lithium secondary battery, wherein the PVdF-based binder polymer includes the first PvdF-based binder polymer and the second PVdF-based binder polymer.

According to an embodiment of the present disclosure, the second PVdF-based binder polymer may be used in an amount of 5 wt % or more, 5-50 wt %, 12-40 wt %, or 12-35 wt %, based on the total weight of the binder polymers contained in the porous coating layer, and the first PVdF-based binder polymer may be the balance. When the content of the second PVdF-based binder polymer is less than the lower limit, β-phase crystals are not formed to a desired level. When the content of the second PVdF-based binder polymer is larger than the upper limit, β-phase crystals are formed excessively so that the binder polymer crystals become excessively hard, and thus deformation of the binder polymer is limited during the lamination of a separator for a lithium secondary battery with electrodes in a dry state to cause a problem in that it is difficult to ensure a desired level of adhesion and/or production processability.

According to an embodiment of the present disclosure, the second PVdF-based binder polymer is present in an amount of 5 wt % or more, 5-50 wt %, 12-40 wt %, or 14-35 wt %, based on the total weight of the binder polymers contained in the porous coating layer. When the content of the second PVdF-based binder polymer is within the above-defined range, electrolyte uptake of the binder polymers is low so that pores may be retained even after impregnation with an electrolyte, and the resistance of a separator for a lithium secondary battery is maintained at a low level.

According to an embodiment of the present disclosure, the binder polymer used for the porous coating layer substantially includes the first PVdF-based binder polymer and the second PVdF-based binder polymer.

According to an embodiment of the present disclosure, the binder polymer used for the porous coating layer includes the first PVdF-based binder polymer and the second PVdF-based binder polymer.

According to an embodiment of the present disclosure, the first PVdF-based binder polymer is PVdF-HFP.

According to an embodiment of the present disclosure, there is provided a separator for a lithium secondary battery, wherein the second PVdF-based binder polymer is PVdF-TFE, PVdF-TrFE or a mixture thereof.

Particularly, a higher substitution ratio with TFE and TrFE in the PVdF-based binder is favorable to an increase in content of β-phase crystals. For example, when the substitution ratio is 5-50 mol % or 10-30 mol %, the content of β-phase crystals is increased advantageously.

The second PVdF-based binder polymer may have a crystallinity of 15-45% or 20-30%. When the crystallinity of the second PVdF-based binder polymer is within the above-defined range, it is possible to control electrolyte uptake to reduce resistance, while preventing degradation of adhesion, caused by excessive hardening.

The second PVdF-based binder polymer may have a melting point of 110-145° C. When the melting point of the PVdF-based binder which is easy to form-phase crystals is within the above-defined range, it is possible to ensure adhesion to an electrode advantageously, while providing low self-adhesion of the coating layer.

The second PVdF-based binder polymer shows lower electrolyte uptake as compared to the first PVdF-based binder polymer or a PVdF-based binder polymer which is easy to form γ-phase crystals, and thus allows retention of pores even after impregnation with an electrolyte. Therefore, the second PVdF-based binder polymer allows a separator for a lithium secondary battery to maintain low resistance.

According to an embodiment of the present disclosure, no dispersing agent may be used for the porous coating layer.

According to another embodiment of the present disclosure, the porous coating layer may further include a dispersing agent. The dispersing agent is used in an amount of 1-3 parts by weight based on 100 parts by weight of the solid content forming the porous coating layer and functions to improve the dispersibility of the inorganic particles. Non-limiting examples of the dispersing agent include anyone selected from the polymeric compounds, such as acrylic copolymers, cyanoethyl polyvinyl alcohol, phenolic compounds, including baicalin, luteolin, taxifolin, myricetin, quercetin, rutin, catechin, epigallocatechin gallate, butein, piceatannol and tannic acid, pyrogallic acid, amylose, amylopectin, xanthane gum and fatty acid compounds, or a mixture of two or more of them.

The acrylic copolymers may be copolymers containing at least one functional group selected from the group consisting of OH, COOH, CN, amine and amide groups.

Particular examples of such acrylic copolymers include, but are not limited to: ethyl acrylate-acrylic acid-N,N-dimethylacrylamide copolymer, ethyl acrylate-acrylic acid-2-(dimethylamino)ethyl acrylate copolymer, ethyl acrylate-acrylic acid-N,N-diethylacrylamide copolymer, ethyl acrylate-acrylic acid-2-(diethylamino)ethyl acrylate copolymer, or two or more of them.

The pore size and porosity of the porous coating layer mainly depend on the size of the inorganic particles. For example, when using inorganic particles having a particle diameter of 1 μm or less, the resultant pores also have a size of 1 μm or less. Such a porous structure is filled with an electrolyte injected subsequently and the electrolyte functions to transport ions. Therefore, the pore size and porosity are important factors which affect control of the ion conductivity of the porous inorganic coating layer.

The porous inorganic coating layer according to an embodiment of the present disclosure may have a pore size of 0.001-10 μm or 0.001-1 μm, preferably.

The porous inorganic coating layer may have a porosity of 5-95 vol %, 10-95 vol %, 20-90 vol %, or 30-80 vol %. The porosity corresponds to the value obtained by subtraction of the volume derived from the weight and density of each of the ingredients of the coating layer from the volume of the porous inorganic coating layer calculated from the thickness, width and length thereof.

When the porous inorganic coating layer has a pore size and porosity within the above-defined range, the separator for a lithium secondary battery according to an embodiment of the present disclosure may be prevented from a short-circuit occurring in an abnormal state and may be provided with suitable resistance characteristics and air permeability at the same time.

3. Method for Forming Porous Coating Layer

According to an embodiment of the present disclosure, the porous coating layer is formed by mixing the inorganic particles with the binder polymer in a solvent to prepare a composition for a porous coating layer, and applying the composition onto a porous polymer substrate, followed by drying.

According to the present disclosure, the solvent is an organic solvent, and any organic solvent may be used with no particular limitation, as long as it can disperse the inorganic particles and the binder polymer homogeneously.

Particular examples of the organic solvent include: cycloaliphatic hydrocarbons, such as cyclopentane and cyclohexane; aromatic hydrocarbons, such as toluene, xylene and ethylbenzene; ketones, such as acetone, ethyl methyl ketone, diisopropyl ketone, cyclohexanone, methylcyclohexane and ethylcyclohexane; chlorinated aliphatic hydrocarbons, such as methylene chloride, chloroform and tetrachlorocarbon; esters, such as ethyl acetate, butyl acetate, γ-butyrolactone and ε-caprolactone; nitriles, such as acetonitrile and propionitrile; ethers, such as tetrahydrofuran and ethylene glycol diethyl ether; alcohols, such as methanol, ethanol, isopropanol, ethylene glycol and ethylene glycol monomethyl ether; and amides, such as N-methyl pyrrolidone and N,N-dimethylformamide. According to an embodiment of the present disclosure, the solvent may include acetone, considering an advantage during a drying process.

Such solvents may be used alone or in combination. Particularly, a solvent having a low boiling point and high volatility is preferred, since it can be removed at low temperature within a short time. Particularly preferred solvents include acetone, toluene, cyclohexanone, cyclopentane, tetrahydrofuran, cyclohexane, xylene, N-methyl pyrrolidone, or a mixed solvent containing two or more of them.

Preferably, the ratio of the inorganic particles to the binder polymer in the composition is the same as described above with regard to the porous coating layer.

There is no particular limitation in the method for forming a porous coating layer by applying the composition onto a porous polymer substrate, and particular examples of the method include dip coating, die coating, roll coating, comma coating, doctor blade coating, reverse roll coating, direct roll coating, or the like.

The coating process for forming a porous coating layer is carried out preferably under a certain range of humidity. After coating the composition, the binder polymer dissolved in the coating layer (composition) has phase transition property through a vapor-induced phase separation phenomenon known to those skilled in the art.

To carry out the phase separation, a non-solvent may be introduced in a gaseous state. The non-solvent is not particularly limited, as long as it cannot dissolve the binder polymer and has partial miscibility with the solvent. For example, the non-solvent may be at least one selected from the group consisting of water, methanol, ethanol, isopropanol and butanol.

When a non-solvent is introduced and added in a gaseous state, there are advantages in that phase separation may be carried out by using a small amount of non-solvent and the inorganic composition may be dried with ease.

Herein, the non-solvent in a gaseous state may be added at a temperature of 15-70° C. When the temperature is lower than 15° C., the non-solvent hardly maintains its gaseous state and the inorganic composition is dried at a low rate, resulting in degradation of productivity. When the temperature is higher than 70° C., the solvent and the non-solvent are dried at an excessively high rate, thereby making it difficult to carry out phase separation sufficiently.

In addition, during the phase separation, the non-solvent may be added in such a manner that the vapor pressure of the non-solvent is 15-80%, or 30-50%, based on the saturated vapor pressure thereof, and then phase separation is carried out sequentially. When the vapor pressure of the non-solvent is less than 15% based on the saturated vapor pressure thereof, the amount of the non-solvent is too small to carry out phase separation sufficiently. When the vapor pressure of the non-solvent is larger than 80% based on the saturated vapor pressure thereof, phase separation occurs excessively, thereby making it difficult to form a uniform coating layer.

To carry out phase separation by adding a non-solvent in a gaseous state, it is advantageous that the solvent has a low boiling point and thus evaporates with ease. In other words, as the solvent evaporates to reduce the temperature, solvent exchange occurs with ease, while the gaseous non-solvent is condensed. According to an embodiment, when a gaseous non-solvent is added, the solvent may have a boiling point of 30-80° C. In addition, the solvent of the inorganic composition to which the gaseous non-solvent is added may be at least one selected from the group consisting of acetone and methyl ethyl ketone.

According to an embodiment of the present disclosure, the separator for a lithium secondary battery may not be subjected to a dipping process during the phase separation or after the phase separation. Preferably, the separator is not subjected to a dipping process during the phase separation or after the phase separation. The dipping process may block the pores formed by the interstitial volumes in the porous coating layer, and thus does not meet a desired effect of the present disclosure, i.e. reduction of resistance.

According to an embodiment of the present disclosure, the separator for a lithium secondary battery may be dried after the phase separation. The drying may be carried out by a process known to those skilled in the art, and may be performed in a batchwise mode or continuous mode by using an oven or heating chamber in a temperature range considering the vapor pressure of the used solvent. The drying substantially removes the solvent present in the composition preferably at high rate, considering productivity, or the like. For example, the drying may be carried out for 1 minute or less, preferably for 30 seconds or less.

The porous coating layer may be selectively formed on both surfaces of the porous polymer substrate, or formed on one surface of the porous polymer substrate.

The separator for a lithium secondary battery obtained as described above may be used as a separator for an electrochemical device. The electrochemical device includes any device which carries out electrochemical reaction, and particular examples thereof include all types of primary batteries, secondary batteries, fuel cells, solar cells, capacitors, or the like. Particularly, among the secondary batteries, lithium secondary batteries, including lithium metal secondary batteries, lithium ion secondary batteries, lithium polymer secondary batteries or lithium ion polymer secondary batteries, are preferred.

According to an embodiment of the present disclosure, a lithium secondary battery may be obtained by a conventional method known to those skilled in the art. According to an embodiment of the present disclosure, the secondary battery may be obtained by interposing the separator between a positive electrode and a negative electrode to prepare an electrode assembly, introducing the electrode assembly to a battery casing, and injecting an electrolyte thereto.

According to an embodiment of the present disclosure, the electrodes of the secondary battery may be obtained by allowing electrode active materials to be bound to an electrode current collector through a method generally known in the art. Among the electrode active materials, non-limiting examples of a positive electrode active material include conventional positive electrode active materials that may be used for the positive electrodes for conventional electrochemical devices. Particularly, lithium intercalation materials, such as lithium manganese oxides, lithium cobalt oxides, lithium nickel oxides, lithium iron oxides or lithium composite oxides containing a combination thereof are used preferably. Non-limiting examples of a negative electrode active material include conventional negative electrode active materials that may be used for the negative electrodes for conventional electrochemical devices. Particularly, lithium intercalation materials, such as lithium metal or lithium alloys, carbon, petroleum coke, activated carbon, graphite or other carbonaceous materials, are used preferably. Non-limiting examples of a positive electrode current collector include foil made of aluminum, nickel or a combination thereof. Non-limiting examples of a negative electrode current collector include foil made of copper, gold, nickel, copper alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and B" includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery. According to an embodiment of the present disclosure, as processes for applying the electrode assembly to a battery, lamination or stacking of a separator with electrodes and folding may be used in addition to a conventional winding process.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLES

Example 1

Preparation of Composition for Forming Porous Coating Layer

As inorganic particles, a mixture containing $Al_2O_3$ powder having an average diameter of 500 nm and γ-AlOOH powder having an average diameter of 250 nm at a weight ratio of 9:1, was prepared.

As binder polymers, two types of PVdF-based binder polymers were prepared, wherein a PVdF-HFP binder polymer (Solvay Co., SOLEF 21510) was prepared as the first PVdF-based binder polymer, and a PVdF-TFE binder polymer (Daikin Co., VT-475) was prepared as the second PVdF-based binder polymer.

The first PVdF-based binder polymer was mixed with the second PVdF-based binder polymer at a weight ratio of 1:1 and the resultant mixture was dissolved in N-methyl pyrrolidone (NMP) as an organic solvent at 50° C. for about 4 hours to prepare a binder polymer solution.

The mixed inorganic particles were added to the binder polymer solution at a weight ratio of the binder polymer: mixed inorganic particles of 35:65.

The inorganic particles were pulverized and dispersed through a ball milling process for 12 hours to obtain a composition for forming a porous coating layer. Herein, the composition for forming a porous coating layer was prepared, while controlling the solid content to 30%.

Formation of Porous Coating Layer on Porous Polymer Substrate

As a porous polymer substrate, a polyethylene porous polymer substrate having a size of 6 cm×15 cm (thickness 9 µm, porosity 43%, air permeation time 110 sec, resistance 0.45Ω) was prepared.

The composition for forming a porous coating layer was applied onto both surfaces of the polyethylene porous polymer substrate having a size of 6 cm×15 cm through a dip coating process. Then, the polyethylene porous polymer substrate coated with the composition for forming a porous coating layer was directly dipped in water as a non-solvent to carry out phase separation through solvent/non-solvent exchange. After that, the substituted non-solvent, water, was dried to obtain a separator for a lithium secondary battery provided with porous coating layers on both surfaces of the porous polymer substrate. The porous coating layer has a structure including interstitial volumes as spaces defined by the adjacent inorganic particles that are substantially in contact with one another, and the interstitial volumes among the inorganic particles become vacant spaces to form the pores of the porous coating layer.

The total coating amount of the porous coating layers applied to both surfaces of the porous polymer substrate was 5.5 g/m².

Example 2

A separator for a lithium secondary battery was obtained in the same manner as Example 1, except that the weight ratio of the PVdF-HFP binder polymer as the first PVdF-based binder polymer to the PVdF-TFE binder polymer as the second PVdF-based binder polymer was changed into 15:85.

Example 3

A separator for a lithium secondary battery was obtained in the same manner as Example 1, except that the PVdF-HFP binder polymer as the first PVdF-based binder polymer was changed into KYNAR 2500 available from Arkema Co.

Comparative Example 1

A separator for a lithium secondary battery was obtained in the same manner as Example 1, except that the PVdF-TFE binder polymer as the second PVdF-based binder polymer was not used but the same amount of the PVdF-HFP binder polymer as the first PVdF-based binder polymer was used instead of the PVdF-TFE binder polymer.

Comparative Example 2

A separator for a lithium secondary battery was obtained in the same manner as Comparative Example 1, except that the PVdF-HFP binder polymer as the first PVdF-based binder polymer was changed into KYNAR 2500 available from Arkema Co.

Comparative Example 3

A separator for a lithium secondary battery was obtained in the same manner as Example 1, except that the PVdF-HFP binder polymer as the first PVdF-based binder polymer was not used but the same amount of the second PVdF-based binder polymer was used instead of the PVdF-HFP binder polymer.

Comparative Example 4

A separator for a lithium secondary battery was obtained in the same manner as Comparative Example 1, except that The PVdF-HFP binder polymer as the first PVdF-based binder polymer was changed into KYNAR 2751 available from Arkema Co.

Comparative Example 5

A separator for a lithium secondary battery was obtained in the same manner as Comparative Example 1, except that The PVdF-HFP binder polymer as the first PVdF-based binder polymer was changed into LBG available from Arkema Co.

Test Example 1: Wide-Angle X-Ray Scattering (WAXS) Analysis of Individual Binder Polymer A sample holder was attached to KAPTON tape by using Xeuss 2.0 SAXS/WAXS system. Each of KYNAR 2500 binder polymer available from Arkema Co., KYNAR 2751 binder polymer available from Arkema Co., LBG binder polymer available from Arkema Co., and SOLEF 21510 binder polymer available from Solvay Co. was analyzed at a SDD of 6.7 cm in a range of $2.5°≤2θ≤52°$ for 120 seconds.

Figure 1:
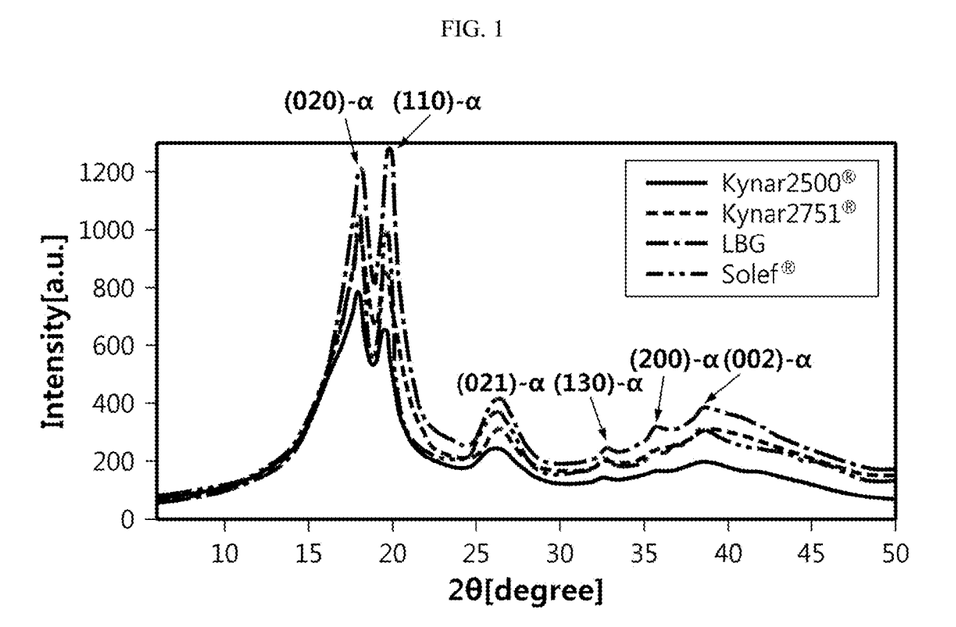
FIG. 1 illustrates the wide-angle X-ray scattering (WAXS) pattern of the first PVdF-based binder polymer used in each of Examples and Comparative Examples.
Figure 2:
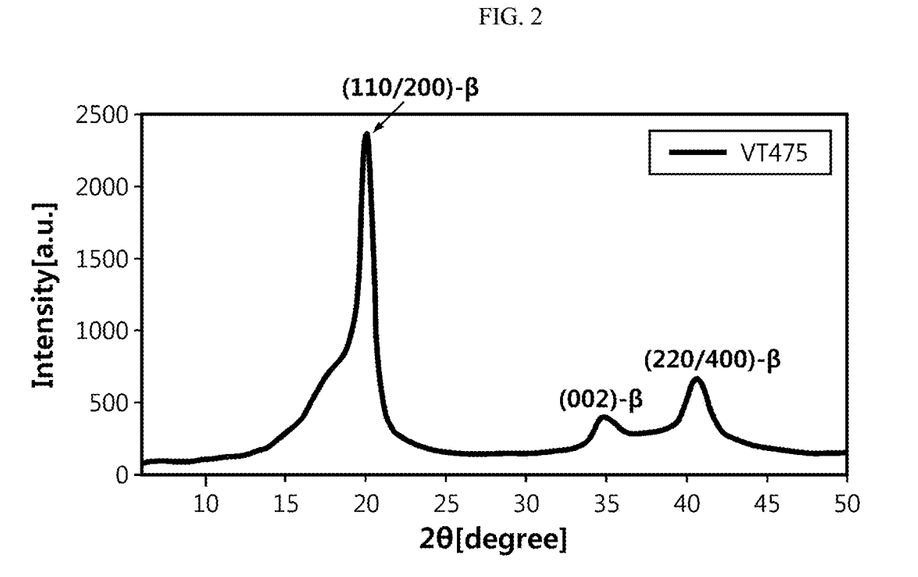
FIG. 2 illustrates the WAXS pattern of the second PVdF-based binder polymer used in each of Examples and Comparative Examples.

The 2D image obtained from the analysis was converted into a 1D image through circular averaging based on beam stop by using Foxtrot program. The converted images are shown in FIG. 1 and FIG. 2. The KAPTON scattering intensity determined with the same configuration (6.7 cm SDD) for the same time was used as background.

Test Example 2: Ratio of Area of Second Peak/Area of First Peak

As described in Examples 1-3 and Comparative Examples 1-5, one type of binder polymer or two mixed binder polymers were prepared, a sample holder was attached to KAPTON tape by using Xeuss 2.0 SAXS/WAXS system, and each sample was analyzed at a SDD of 6.7 cm in a range of $2.5°≤2θ≤52°$ for 120 seconds.

The 2D image obtained from the analysis was converted into a 1D image through circular averaging based on beam stop by using Foxtrot program. The KAPTON scattering intensity determined with the same configuration (6.7 cm SDD) for the same time was used as background.

In the 1D image, the peak at a $2θ$ of $18.2±0.2°$ around a $2θ$ of $18.2°$ was defined as the first peak and the peak at a $2θ$ of $19.8±0.2°$ around a $2θ$ of $19.8°$ was defined as the second peak.

The first peak and the second peak were isolated and the area of each peak was calculated. The ratio of the area of the second peak/area of the first peak is shown in the following Table 1.

TABLE 1

| | wt % of the first PVdF-based binder polymer (PVdF-HFP) based on the total weight of binder polymers | wt % of the second PVdF-based binder polymer (PVdF-TFE) based on the total weight of binder polymers | Ratio (A) of area of second peak/area of first peak |
|---|---|---|---|
| Ex. 1 | 50 wt % | 50 wt % | 1.74 |
| Ex. 2 | 15 wt % | 85 wt % | 2.49 |

TABLE 1-continued

| | wt % of the first PVdF-based binder polymer (PVdF-HFP) based on the total weight of binder polymers | wt % of the second PVdF-based binder polymer (PVdF-TFE) based on the total weight of binder polymers | Ratio (A) of area of second peak/area of first peak |
|---|---|---|---|
| Ex. 3 | 15 wt % (different from product according to Ex. 2 is used) | 85 wt % | 2.58 |
| Ex. 4 | 80 wt % (the same product as product according to Ex. 1 is used) | 20 wt % | 1.31 |
| Comp. Ex. 1 | 100 wt % | 0 wt % | 0.91 |
| Comp. Ex. 2 | 100 wt % (different from product according to Comp. Ex. 1 is used) | 0 wt % | 0.88 |
| Comp. Ex. 3 | 0 wt % | 100 wt % | 2.88 |
| Comp. Ex. 4 | 100 wt % (different from product according to Comp. Ex. 1 is used) | 0 wt % | 0.85 |
| Comp. Ex. 5 | 100 wt % (different from product according to Comp. Ex. 1 is used) | 0 wt % | 1.04 |
| Comp. Ex. 6 | 90 wt % (the same product as product according to Comp. Ex. 1 is used) | 10 wt % | 1.11 |
| Comp. Ex. 7 | 90 wt % (the same product as product according to Comp. Ex. 1 is used) | 10 wt % | 1.08 |

It can be seen from the above results that each of Examples 1-3 shows a ratio of the area of the second peak/area of the first peak of 1.74, 2.49 and 2.58, respectively, while each of Comparative Examples 1-5 shows a ratio of the area of the second peak/area of the first peak of 0.91, 0.88, 2.88, 0.85 and 1.04, respectively.

Test Example 3: Determination of Resistance of Separator

The resistance of each of the separators according to Examples and Comparative Examples was determined by the following method.

$LiPF_6$ was dissolved in a mixed solvent containing ethylene carbonate, propylene carbonate and propyl propionate at a volume ratio of 25:10:65 to a concentration of 1M to prepare an electrolyte. Each separator was impregnated with the electrolyte and a coin cell was manufactured. Then, the electrical resistance of each coin cell was determined by using electrochemical impedance spectroscopy (EIS). The results are shown in the following Table 2.

Test Example 4: Adhesion of Negative Electrode-Separator

Negative electrode slurry was prepared by mixing artificial graphite, carbon black, carboxymethyl cellulose and an acrylic copolymer as a binder at a weight ratio of 93:1:1:5 and dispersing the resultant mixture in water. The negative electrode slurry was coated on a copper current collector, followed by drying and pressing, to obtain a negative electrode.

Each of the separators obtained from Examples and Comparative Examples was stacked on the negative electrode in such a manner that the porous coating layer of each separator might face the negative electrode, and the resultant structure was interposed between two sheets of polyethylene terephthalate (PET) films having a thickness of 100 μm. Then, pressing was carried out at 60° C. under 1000 kgf for 1 second to laminate the negative electrode with the separator. The resultant product was fixed to an adhesive strength measuring instrument (LLOYD Instrument, LF plus), and the separator specimen at the upper part was peeled at an angle of 180° under the conditions of 25° C. and a rate of 25 mm/min. Then, the peel strength was measured. The results are shown in the following Table 2.

TABLE 2

| | Resistance of separator (ohm) | Negative electrode/ separator adhesion (gf/25 mm) |
|---|---|---|
| Ex. 1 | 0.75 | 80.6 |
| Ex. 2 | 0.69 | 74.3 |
| Ex. 3 | 0.72 | 76.2 |
| Ex. 4 | 0.78 | 84.3 |
| Comp. Ex. 1 | 0.98 (NG) | 90.2 |
| Comp. Ex. 2 | 1.01 (NG) | 90.5 |
| Comp. Ex. 3 | 0.66 | 45.2 (NG) |
| Comp. Ex. 4 | 0.93 (NG) | 78.2 |
| Comp. Ex. 5 | 0.81 (NG) | 58.4 (NG) |
| Comp. Ex. 6 | 0.84 (NG) | 86.6 |
| Comp. Ex. 7 | 0.87 (NG) | 88.9 |

What is claimed is:

1. A separator for a lithium secondary battery comprising:
a porous polymer substrate; and
a porous coating layer positioned on at least one surface of the porous polymer substrate, the porous coating layer comprising inorganic particles and a binder polymer, wherein the binder polymer comprises a PVdF-based binder polymer, and the PVdF-based binder polymer has a first peak at a 2θ of 18.2±0.2° and a second peak at a 2θ of 19.8±0.2°, as analyzed by X-ray diffractometry, and a ratio of an area of the second peak to an area of the first peak is equal to or more than 1.25 and less than 2.75,
wherein the PVdF-based binder polymer comprises a first PVdF-based binder polymer and a second PVdF-based binder polymer, wherein the second PVdF-based binder polymer is different from the first PVdF-based binder polymer.

2. The separator according to claim 1, wherein the first PVdF-based binder polymer is polyvinylidene fluoride-hexafluoropropylene (PVdF-HFP).

3. The separator according to claim 1, wherein the porous coating layer comprises interstitial volumes among the inorganic particles, wherein the interstitial volumes are spaces defined by the inorganic particles that are adjacent and substantially in contact with one another, and the interstitial volumes among the inorganic particles are vacant spaces to form pores of the porous coating layer.

4. The separator according to claim 1, wherein the second PVdF-based binder polymer is polyvinylidene fluoride-tetrafluoroethylene (PVdF-TFE), polyvinylidene fluoride-trifluoroethylene (PVdF-TrFE), or a mixture thereof.

5. The separator according to claim 4, wherein the second PVdF-based binder polymer is used in an amount of 5-50 wt % based on a total weight of the binder polymer contained in the porous coating layer.

6. The separator according to claim 4, wherein the second PVdF-based binder polymer is used in an amount of 12-35 wt % based on a total weight of the binder polymer contained in the porous coating layer.

7. The separator according to claim 4, wherein PVdF-TFE and PVdF-TrFE have a ratio of substitution with TFE and TrFE of 5-50 mol %, respectively.

8. The separator according to claim 4, wherein PVdF-TFE and PVdF-TrFE have a ratio of substitution with TFE and TrFE of 10-30 mol %, respectively.

9. The separator according to claim 1, wherein the first PVdF-based binder polymer is polyvinylidene fluoride-hexafluoropropylene (PVdF-HFP) and the second PVdF-based binder polymer is polyvinylidene fluoride-tetrafluoroethylene (PVdF-TFE), polyvinylidene fluoride-trifluoroethylene (PVdF-TrFE), or a mixture thereof.

10. The separator according to claim 9, wherein the second PVdF-based binder polymer is used in an amount of 5-50 wt % based on a total weight of the binder polymer contained in the porous coating layer.

11. The separator according to claim 9, wherein the second PVdF-based binder polymer is used in an amount of 12-35 wt % based on a total weight of the binder polymer contained in the porous coating layer.

12. The separator according to claim 9, wherein PVdF-TFE and PVdF-TrFE have a ratio of substitution with TFE and TrFE of 5-50 mol %, respectively.

13. The separator according to claim 9, wherein PVdF-TFE and PVdF-TrFE have a ratio of substitution with THE and TrFE of 10-30 mol %, respectively.

14. A lithium secondary battery comprising a positive electrode, a negative electrode and a separator interposed between the positive electrode and the negative electrode, wherein the separator is the separator as defined in claim 1.

* * * * *